(12) United States Patent
Tamano

(10) Patent No.: US 9,983,396 B2
(45) Date of Patent: May 29, 2018

(54) SCANNING MICROSCOPE HAVING FOCAL POSITION ADJUSTMENT UNIT WHICH INCLUDES A DEFLECTING ELEMENT

(71) Applicant: OLYMPUS CORPORATION, Shibuya-ku, Tokyo (JP)

(72) Inventor: Shingo Tamano, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 600 days.

(21) Appl. No.: 14/543,394

(22) Filed: Nov. 17, 2014

(65) Prior Publication Data

US 2015/0153554 A1 Jun. 4, 2015

(30) Foreign Application Priority Data

Dec. 4, 2013 (JP) ................................. 2013-251283

(51) Int. Cl.
*G02B 21/00* (2006.01)
*G02B 21/02* (2006.01)
*G02B 21/24* (2006.01)
*G02B 21/36* (2006.01)

(52) U.S. Cl.
CPC ....... *G02B 21/0076* (2013.01); *G02B 21/002* (2013.01); *G02B 21/025* (2013.01); *G02B 21/241* (2013.01); *G02B 21/361* (2013.01)

(58) Field of Classification Search
None
See application file for complete search history.

(56) References Cited

U.S. PATENT DOCUMENTS

| 5,640,270 A * | 6/1997 | Aziz ........................ G01B 9/04 250/201.3 |
| 2005/0247874 A1* | 11/2005 | Ando ..................... G01Q 20/02 850/6 |
| 2007/0057211 A1 | 3/2007 | Bahlman et al. |

(Continued)

FOREIGN PATENT DOCUMENTS

| JP | 2008197127 A | 8/2008 |
| JP | 2009181123 A | 8/2009 |

OTHER PUBLICATIONS

Extended European Search Report dated Apr. 24, 2015, issued in counterpart European Application No. 14193422.4.

*Primary Examiner* — Stephone B Allen
*Assistant Examiner* — Ryan S Dunning
(74) *Attorney, Agent, or Firm* — Holtz, Holtz & Volek PC

(57) ABSTRACT

A scanning microscope includes a collecting lens that takes in a detection light, a focal position adjustment unit that moves in an optical axis direction of the collecting lens to make the collecting lens move in the optical axis direction, a detector positioned at a location that is optically conjugate to a pupil of the collecting lens, and a relay optical system that relays the pupil to the detector. The relay optical system includes a first optical element with a positive power, the first optical element being positioned in the focal position adjustment unit and converting the detection light that was converted by the collecting lens into a parallel light flux, into a convergent light flux to be emitted outside of the focal position adjustment unit, and a second optical element that is positioned outside of the focal position adjustment unit and between the detector and the first optical element.

17 Claims, 8 Drawing Sheets

(56) References Cited

U.S. PATENT DOCUMENTS

| | | |
|---|---|---|
| 2009/0194715 A1 | 8/2009 | Schadwinkel et al. |
| 2009/0236549 A1 | 9/2009 | Vogt |
| 2014/0055852 A1* | 2/2014 | Vizi .................. G02B 21/06 359/385 |
| 2016/0209646 A1* | 7/2016 | Hattori ............... G02B 21/06 |

* cited by examiner

<PRIOR ART>

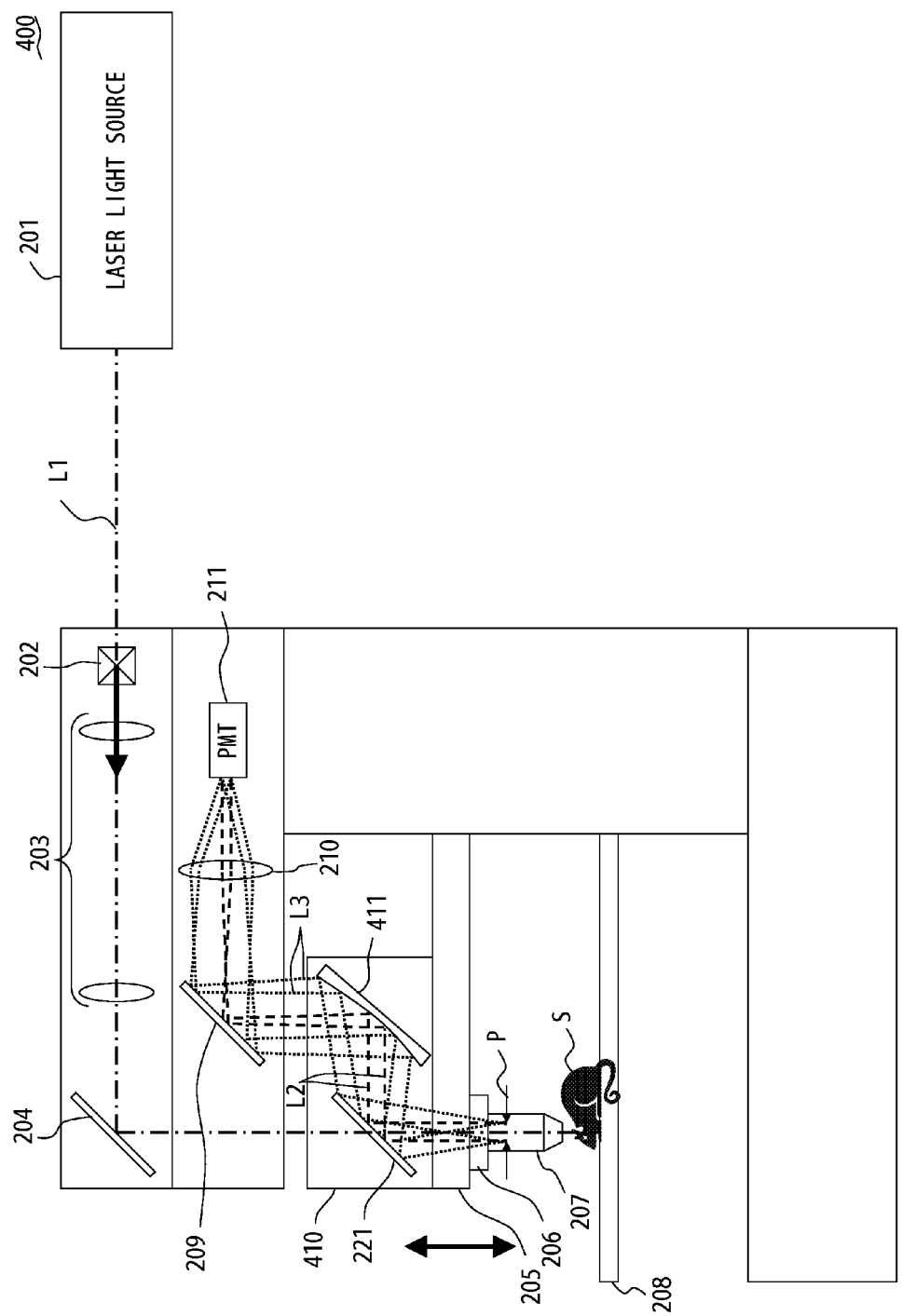
F I G. 5

SCANNING MICROSCOPE HAVING FOCAL POSITION ADJUSTMENT UNIT WHICH INCLUDES A DEFLECTING ELEMENT

CROSS REFERENCE TO RELATED APPLICATIONS

This application is based upon and claims the benefit of priority from prior Japanese Patent Application No. 2013-251283, filed on Dec. 4, 2013, the entire contents of which are incorporated herein by reference.

BACKGROUND OF THE INVENTION

Field of the Invention

The present invention is related to a scanning microscope, and in particular, the present invention is related to a scanning microscope that includes a focal position adjustment unit configured to adjust a focal position of an objective or a condenser lens with respect to a sample.

Description of the Related Art

In the field of microscopy, various methods have been proposed as methods for adjusting a focal position with respect to a sample, and as one such method, a method of making an objective move in an optical axis direction is known. In general, a microscope that adjusts the focal position with this method is configured such that a revolver to which the objective is mounted and a revolver arm moves in the optical axis direction. Such a configuration is preferable for executing a patch clamp method that uses a relatively large space in an upper side of a stage by using an upright multi-photon excitation laser microscope, for example.

When the objective is made to move in the optical axis direction in a microscope that employs an epi-illumination, vignetting may occur in an optical system between the objective and a detector, due to a change in an optical path length between the objective and the detector. Specific explanations are given for this point, in reference to FIG. 1.

FIG. 1 illustrates a configuration of a multi-photon excitation laser microscope 100 related to a prior art. The multi-photon excitation laser microscope 100 is a scanning microscope that includes an XY scanner 102 at a position that is optically conjugate to a position of a pupil P of the objective 107 on an illumination optical path (hereinafter called a pupil-conjugate position) and a photomultiplier tube (hereinafter called a PMT) 109 as a non-descanned detector (also called an NDD) at a pupil-conjugate position of the objective 107 on a detection optical path. A relay optical system 103 is an optical system that relays the pupil P of the objective 107 to the XY scanner 102. A relay optical system 108 is an optical system that relays the pupil P of the objective 107 to the PMT 109.

In the multi-photon excitation laser microscope 100, fluorescence generated from a sample S by irradiation of laser light L1 (a dotted dashed line in FIG. 1) that has been emitted from a laser light source 101 is converted by the objective 107 into a parallel light flux. After that, the fluorescence is reflected on a dichroic mirror 104, and is incident to the PMT 109 through the relay optical system 108.

When the objective 107 is made to move in the optical axis direction to adjust the focal position in the multi-photon excitation laser microscope 100, the dichroic mirror 104 does not move, while the revolver 106 and revolver arm 105 move together with the objective 107 in the optical axis direction. Consequently, a distance from the objective 107 to the dichroic mirror 104 changes.

A light flux L2 (a dashed line of FIG. 1) on an optical axis of fluorescence emitted from the objective 107 parallel to the optical axis is incident to the same position of the dichroic mirror 104, even when the distance between the objective 107 and the dichroic mirror 104 changes. On the other hand, an off-axis light flux L3 (a dotted line of FIG. 1) of fluorescence emitted from the objective 107 at an angle with respect to the optical axis deviates from the dichroic mirror 104 when the distance between the objective 107 and the dichroic mirror 104 becomes too long, and vignetting is likely to occur.

Technologies of suppressing the occurrence of the above mentioned vignetting due to the adjustment of the focal position are disclosed, for example, in Japanese Laid-open Patent Publication No. 2009-181123 and Japanese Laid-open Patent Publication No. 2008-197127. Japanese Laid-open Patent Publication No. 2009-181123 discloses a configuration in which a decoupling unit and a detector are provided between the objective and a guiding unit that is necessary for focusing an objective exchanger (paragraph [0009] of Japanese Laid-open Patent Publication No. 2009-181123). In such a configuration, since the entire detection system moves together with the objective when adjusting the focal position, the optical path length from the objective to the detector does not change and vignetting is not likely to occur.

Japanese Laid-open Patent Publication No. 2008-197127 discloses a microscope objective that includes an optical path division means and a detector (paragraph [0010] of Japanese Laid-open Patent Publication No. 2008-197127). In such a configuration, since the detection system is provided in the objective, a distance from a sample (i.e., a focal position) to the detector is always constant, and therefore, vignetting is not likely to occur.

SUMMARY OF THE INVENTION

One aspect of the present embodiments provides a scanning microscope including a collecting lens that takes in a detection light from a sample, a focal position adjustment unit configured to move in an optical axis direction of the collecting lens together with the collecting lens to make the collecting lens move in the optical axis direction, a detector positioned at a location that is optically conjugate to a pupil of the collecting lens, and a relay optical system that relays the pupil of the collecting lens to the detector, wherein the relay optical system includes a first optical element that has a positive power, the first optical element being positioned in the focal position adjustment unit and converting the detection light that was converted by the collecting lens into a parallel light flux into a convergent light flux to be emitted outside of the focal position adjustment unit, and a second optical element that is positioned outside of the focal position adjustment unit and between the first optical element and the detector.

BRIEF DESCRIPTION OF THE DRAWINGS

The present invention will be more apparent from the following detailed description when the accompanying drawings are referenced.

FIG. 5 illustrates a configuration of a multi-photon excitation laser microscope according to embodiment 3 of the present invention.

DESCRIPTION OF THE EMBODIMENTS

Recently, in the field of non-linear optical microscopy such as the above mentioned multi-photon excitation laser microscope, demand for multiple channels has been increasing and there have been quite a few microscopes that have been provided with a plurality of detectors.

However, when the technologies disclosed in Japanese Laid-open Patent Publication No. 2009-181123 and Japanese Laid-open Patent Publication No. 2008-197127 are employed, it is difficult to secure a space in which a plurality of detectors can be provided. Even when a space in which a plurality of detectors can be provided may be secured, the size of the objective or its peripheral structure increases. Accordingly, a space at the upper side of the stage on which a user operates a sample becomes narrow, and executing the patch clamp method becomes difficult.

Further, with the increase in weight in accordance with the increased size of the objective or its peripheral structure, some problems arise including that a higher withstand load and rigidity is required than in the past for a holding mechanism that holds the objective or its peripheral structure, and that it is difficult for the focal position adjustment unit that makes the objective move in the optical axis direction to make the objective move accurately.

Hereinafter, explanations are given for the embodiments of the present invention in view of the above mentioned circumstances.

Embodiment 1

Figure 1:
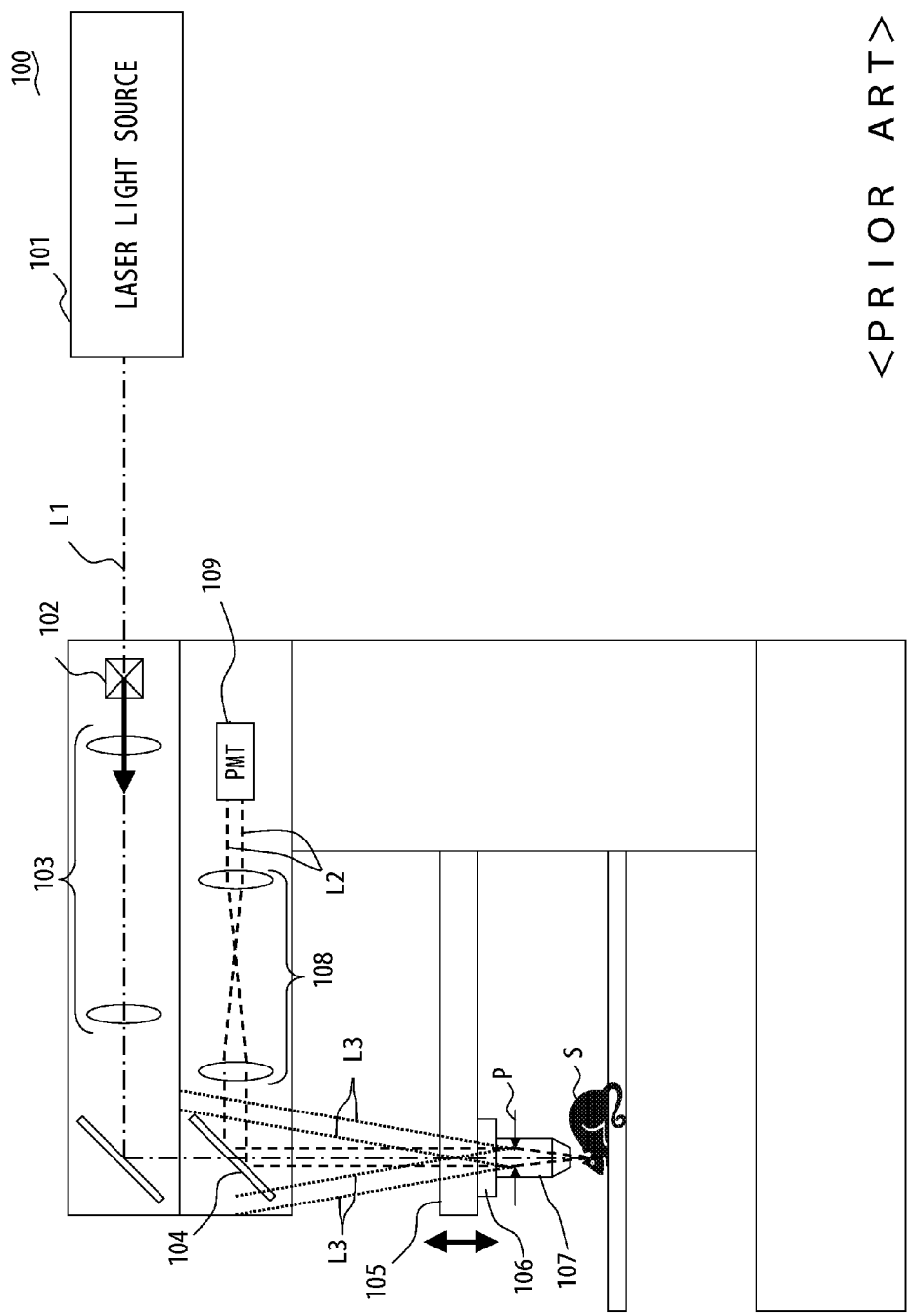
FIG. 1 illustrates a configuration of a multi-photon excitation laser microscope according to the prior art.
Figure 2:
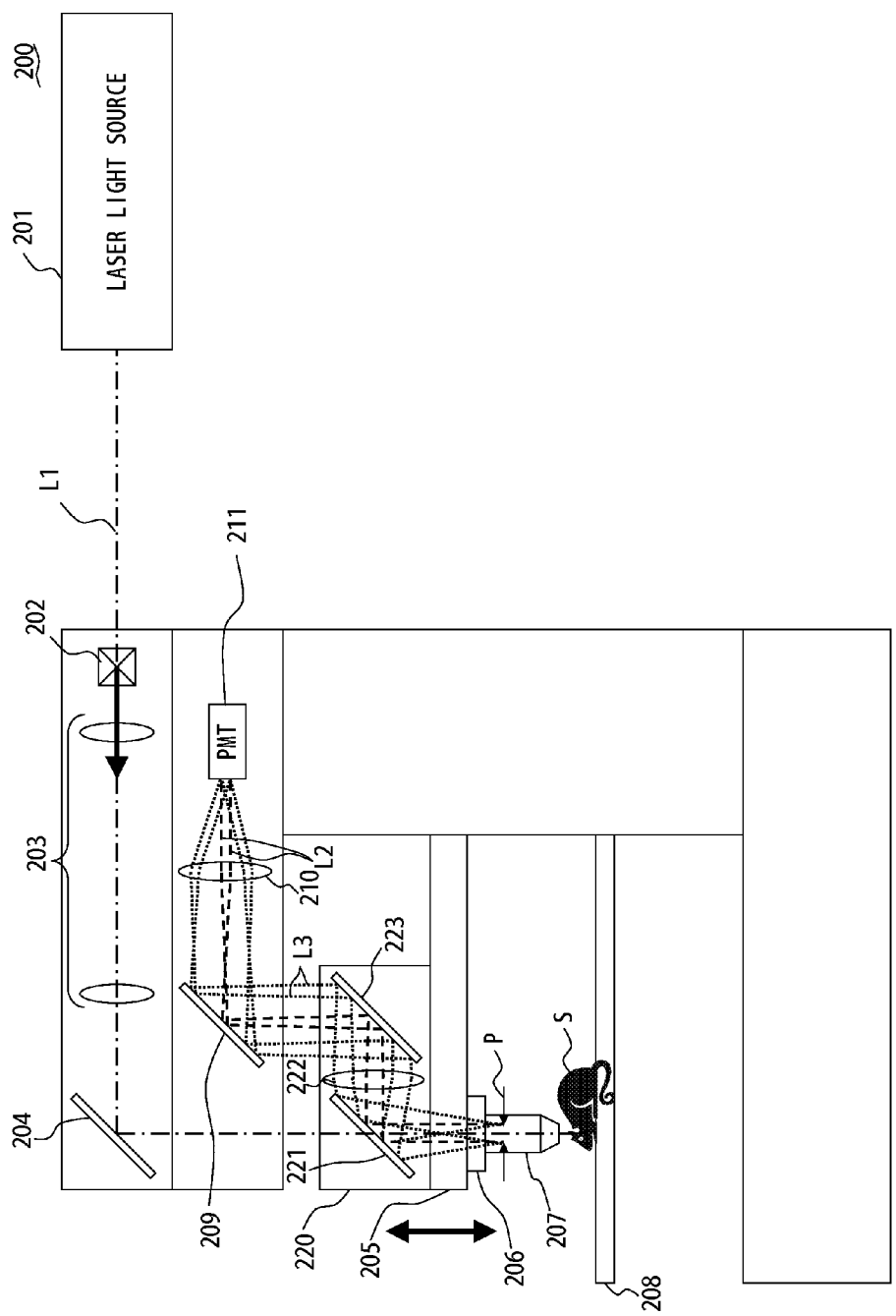
FIG. 2 illustrates a configuration of a multi-photon excitation laser microscope according to embodiment 1 of the present invention.

FIG. 2 illustrates a configuration of a multi-photon excitation laser microscope 200 according to the present embodiment. The multi-photon excitation laser microscope 200 is an upright microscope that observes a sample S positioned on a stage 208 from the upper side. In the multi-photon excitation laser microscope 200, epi-illumination is employed, and a laser light L1, which is an illumination light (an excitation light), is irradiated onto the sample S through an objective 207 that takes in fluorescence (an on-axis light flux L2, an off-axis light flux L3), which is a detection light from the sample S. In FIG. 2, the laser light L1 is indicated by a dotted dashed-line, the on-axis light flux L2 in the fluorescence is indicated by a dashed line, and the off-axis light flux L3 in the fluorescence is indicated by a dotted line.

The multi-photon excitation laser microscope 200 is a scanning microscope that includes an XY scanner 202 at a position that is optically conjugate to a position of the pupil P of the objective 207 on an illumination optical path (hereinafter called a pupil-conjugate position), and a PMT 211 as a non-descanned detector at a pupil-conjugate position of the objective 207 on a detection optical path.

The multi-photon excitation laser microscope 200 includes, on an illumination optical path, a laser light source 201 that emits the laser light L1, an XY scanner 202 that is a scanning means for scanning the sample S with the laser light L1, and a relay optical system 203 that relays the pupil P of the objective 207 to the XY scanner 202. The multi-photon excitation laser microscope 200 further includes, on the illumination optical path, a mirror 204 that deflects the laser light L1 in the optical axis direction of the objective 207, a dichroic mirror 221, which is a wavelength branching element, that branches according to wavelength the optical path of the laser light L1 and the optical path of the fluorescence (the on-axis light flux L2, the off-axis light flux L3), and an objective 207. The dichroic mirror 221 is a dichroic mirror that makes the laser light L1 transmit and makes the fluorescence reflect. The XY scanner 202 is a galvano mirror, for example.

The objective 207 is attached to a revolver 206 that is supported by a revolver arm 205. Further, on the revolver arm 205, a housing 220 inside which the dichroic mirror 221 is positioned is provided.

The revolver 206, the revolver arm 205, and the housing 220 are the focal position adjustment unit that makes the objective 207 move in the optical axis direction, and the revolver 206, the revolver arm 205, and the housing 220 move in the optical axis direction together with the objective 207. In the multi-photon excitation laser microscope 200, the focal position adjustment unit provided on the epi-illumination optical path moves the objective 207 in the optical axis direction, the focal position of the objective 207 is adjusted for the sample S.

The multi-photon excitation laser microscope 200 includes, on a detection optical path, the objective 207, the dichroic mirror 221, and a lens 222 that has a positive power and converts the fluorescence that was converted by the objective 207 into a parallel light flux into a convergent light flux. The multi-photon excitation laser microscope 200 further includes, on the detection optical path, a mirror 223 that is a deflection element that deflects the fluorescence in a direction that is parallel to the optical axis of the objective 207, a mirror 209, a lens 210 that has a positive power, and a PMT 211. Since the dichroic mirror 221, the lens 222, and the mirror 223 are positioned in the housing 220 (i.e., in the focal position adjustment unit), they move in the optical axis direction, together with the objective 207.

The lens 222 positioned in the focal position adjustment unit and the lens 210 that is positioned in the microscope body (i.e., outside of the focal position adjustment unit) and is positioned between the lens 222 and the PMT 211 configure a relay optical system that relays the pupil P of the objective 207 to the PMT 211. Namely, the lenses 222 and 210 are the first and second optical elements of the relay optical system, respectively.

In the multi-photon excitation laser microscope 200 configured as mentioned above, the dichroic mirror 221 is positioned in the housing 220 that is fixed on the revolver arm 205. Accordingly, even though the objective 207 moves in the optical axis direction, the distance from the objective 207 to the dichroic mirror 221 does not change. Accordingly, even though the objective 207 is made to move in the optical axis direction to adjust the focal position, the off-axis light flux L3 is incident to a fixed position, and accordingly, vignetting at the dichroic mirror 221 caused by the adjustment of the focal position may be prevented.

Further, in the multi-photon excitation laser microscope 200, the lens 222 having a positive power is positioned in the housing 220 and between the dichroic mirror 221 and the mirror 223. Therefore, the fluorescence that has been converted by the objective 207 into the parallel light flux and is incident to the housing 220 is converted by the lens 222 into the convergent light flux and is emitted outside of the housing 220 (the focal position adjustment unit). With this, the vignetting that is more likely to occur at the position between the lens 222 and PMT 211 may be suppressed.

More specific explanations are given for this point. A principal ray of the off-axis light flux L3 that is emitted at an inclined angle from the pupil P of the objective 207 with respect to the optical axis is refracted inwardly due to the positive power of the lens 222, and the direction of the principal ray of the off-axis light flux L3 comes close to the optical axis direction of the lens 222. Namely, an angle of the principal ray of the off-axis light flux L3 is suppressed. When the objective 207 is made to move in the optical axis direction of the objective 207, for the adjustment of the focal position, the distance between the mirrors 223 and 209 changes. Even in such a case, since the angle of the principal ray of the off-axis light flux L3 is suppressed, before the principal ray passes between the mirrors 223 and 209 in which the distance changes, it may prevent the principal ray of the off-axis light flux L3 from passing through a position that is far apart from the optical axis. Accordingly, the occurrence of vignetting at the optical element that is between the lens 222 and the PMT 211, and in particular, the occurrence of vignetting at the optical element in the microscope body, may be suppressed.

Further, by converting the fluorescence into the convergent light flux by using the positive power of the lens 222, a light flux diameter of the off-axis light flux L3 from the lens 222 to a position (the imaging-conjugate position) that is optically conjugate to the focal position (the sample S) of the objective 207 in the microscope body gradually narrows. Accordingly, in an optical element that is between the lens 222 and the imaging-conjugate position, in contrast with when there is no lens 222, the off-axis light flux L3 with a narrower light flux diameter enters. Accordingly, even though the off-axis light flux L3 passes through a position that is apart from the optical axis, the vignetting that may occur at the optical element that is positioned between the lens 222 and the PMT 211 may be suppressed, since some or all of the off-axis light flux L3 is less likely to project from the optical element.

As mentioned above, according to the multi-photon excitation laser microscope 200, since the occurrence of vignetting caused by the adjustment of the focal position may be suppressed, the fluorescence generated at the sample S including fluorescence that is scattered in the sample S may be efficiently detected. Therefore, bright images may be obtained.

Further, in the multi-photon excitation laser microscope 200, the PMT 211 is not positioned in the focal position adjustment unit, and the optical element that is positioned in the focal position adjustment unit is relatively small and light weight. Accordingly, the focal position adjustment unit may be configured to be light weight and compact. Therefore, the space at the upper side of the stage 208 may be sufficiently secured, and at the same time, the focal position may be adjusted with high accuracy.

Figure 3A:
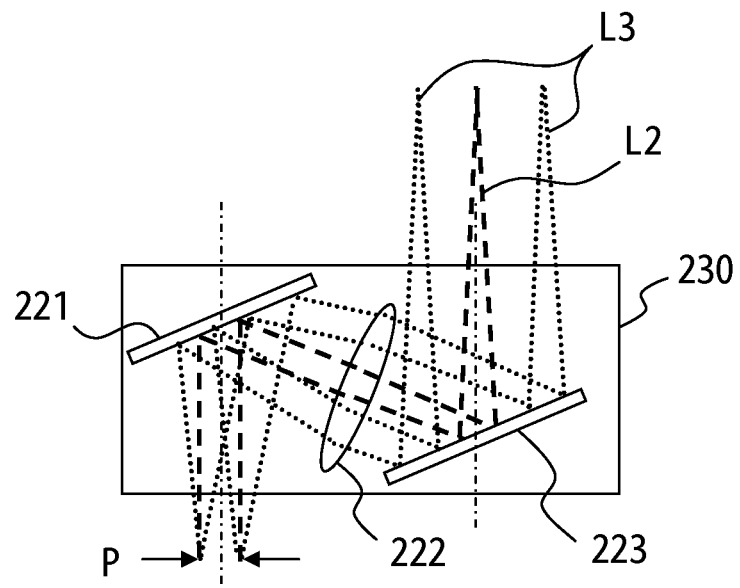
FIG. 3A illustrates a modification example of a configuration in a housing of a multi-photon excitation laser microscope illustrated in FIG. 2.
Figure 3B:
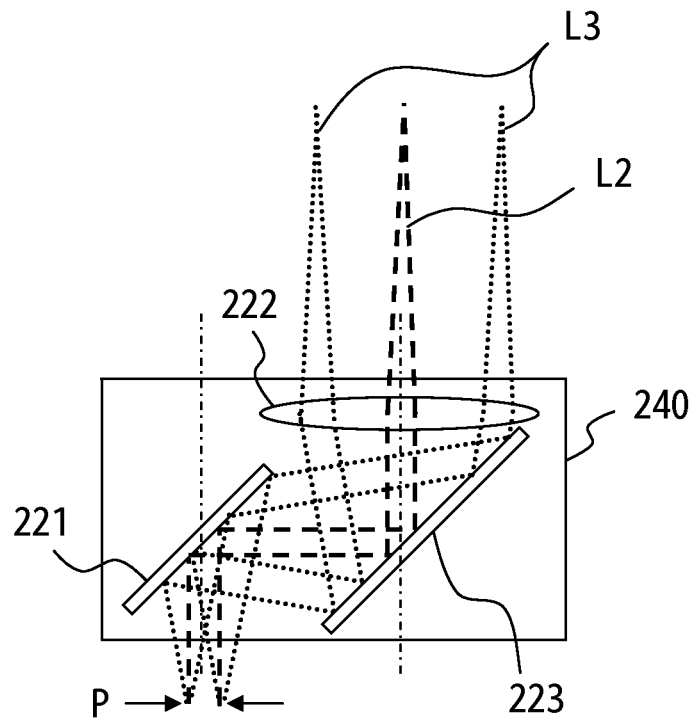
FIG. 3B illustrates another modification example of a configuration in a housing of a multi-photon excitation laser microscope illustrated in FIG. 2.

In the meantime, various modifications may be made to the position of the optical element in the housing, so long as the fluorescence is incident to the lens 222 as a parallel light flux and so long as the fluorescence that has been converted by the lens 222 into the convergent light flux is emitted from the housing toward the mirror 209. As illustrated in the housing 230 of FIG. 3A, for example, in accordance with the features of the dichroic mirror 221, the dichroic mirror 221 may be positioned at an angle that is other than 45° with respect to the optical axis of the objective 207. In this case, orientations of other optical elements (the lens 222, the mirror 223) are adjusted according to the orientation of the dichroic mirror 221. In addition, as illustrated in the housing 240 in FIG. 3B, for example, the lens 222 may be positioned between the mirror 223 and the PMT 211. In other words, the lens 222 and the mirror 223 may be positioned between the dichroic mirror 221 and the PMT 211, and the dichroic mirror 221 may be positioned between the lens 222 and the objective 207.

In addition, the lens 222 is not limited to a single focus lens but may be a variable focus lens, which is an optical system in which the focal length is variable. By configuring the lens 222 to be a variable focus lens and by changing the focal length in accordance with a Z position of the objective, the light flux diameter of the fluorescence that is incident to the PMT 211 may be optimized, regardless of the Z position of the objective. Further, by using a lens that has a long focal length as the lens 222, the angle at which the off-axis light flux L3 converges or diverges becomes gentler. Therefore, the lens 222 that has a long focal length is desirable for suppressing the occurrence of vignetting at the optical element that is between the PMT 211 and the lens 222.

Further, various optical elements may be positioned between the laser light source 201 and the XY scanner 202. For example, an AOM (Acousto-Optic Modulator), a beam expander, laser synthesizing elements such as a dichroic mirror for synthesizing a plurality of laser lights, and wavefront correction elements such as an LCOS (Liquid Crystal On Silicon) or a DMD (Digital Mirror Device).

Embodiment 2

Figure 4:
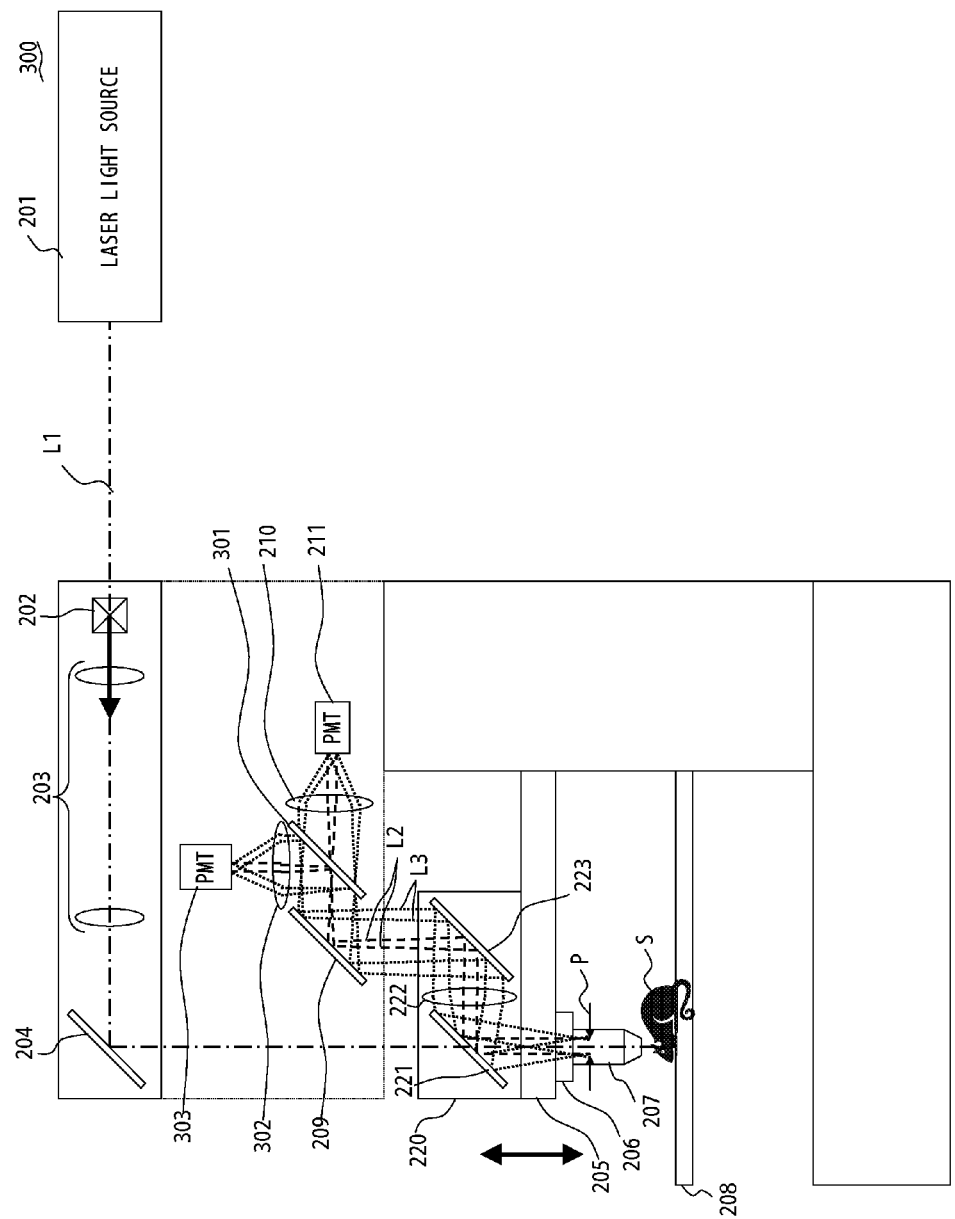
FIG. 4 illustrates a configuration of a multi-photon excitation laser microscope according to embodiment 2 of the present invention.

FIG. 4 illustrates a configuration of a multi-photon excitation laser microscope 300 according to the present embodiment. In FIG. 4, the laser light L1 is indicated by a dotted dashed line, the on-axis light flux L2 in the fluorescence is indicated by a dashed line, and the off-axis light flux L3 in the fluorescence is indicated by a dotted line.

The multi-photon excitation laser microscope 300 is similar to the multi-photon excitation laser microscope 200 according to embodiment 1 in that it is an upright microscope and observes the sample S positioned on the stage 208 from the upper side, and in that it employs epi-illumination. The multi-photon excitation laser microscope 300 is different from the multi-photon excitation laser microscope 200 in that it includes a plurality of PMTS and is multi-channeled.

The multi-photon excitation laser microscope 300 includes the dichroic mirror 301 between the mirror 209 and the lens 210 inside of the microscope body, and further, it includes the lens 302 and the PMT 303, on the reflection optical path of the dichroic mirror 301. With this, according to the multi-photon excitation laser microscope 300, a multicolor imaging using a plurality of fluorescent pigments may be realized.

The multi-photon excitation laser microscope 300 is similar to the multi-photon excitation laser microscope 200 in that the occurrence of vignetting in accordance with the adjustment of the focal position may be suppressed, and in that the focal position may be adjusted with a high accuracy while sufficiently securing the space in the upper side of the stage 208 by using a lightweight and compact focal position adjustment unit.

Further, similarly to the multi-photon excitation laser microscope 200, various modifications may be made to the multi-photon excitation laser microscope 300.

Embodiment 3

FIG. 5 illustrates a configuration of a multi-photon excitation laser microscope 400 according to the present embodiment. In FIG. 5, the laser light L1 is indicated by a dotted dashed line, the on-axis light flux L2 in the fluorescence is indicated by a dashed line, and the off-axis light flux L3 in the fluorescence is indicated by a dotted line.

The multi-photon excitation laser microscope 400 is similar to the multi-photon excitation laser microscope 200 according to embodiment 1 in that it is an upright microscope and observes the sample S positioned on the stage 208 from the upper side, and in that it employs epi-illumination. The multi-photon excitation laser microscope 400 is different from the multi-photon excitation laser microscope 200 in that it includes a housing 410 instead of the housing 220.

The housing 410 is similar to the housing 220 in that it includes the dichroic mirror 221 inside. However, the housing 410 is different from the housing 220 in that it includes, in the housing 410 (i.e., in the focal position adjustment unit), a concave mirror 411 that has a positive power instead of the lens 222 and mirror 223.

In the multi-photon excitation laser microscope 400, the concave mirror 411 and the lens 210 configure the relay optical system that relays the pupil P of the objective 207 to the PMT 211. The concave mirror 411 that is positioned between the PMT 211 and the dichroic mirror 221 converts the fluorescence that has been converted into the parallel light flux by objective 207 into the convergent light flux and emits the fluorescence outside of the focal position adjustment unit toward the mirror 209. Namely, the concave mirror 411 is a first optical element that configures the relay optical system and it is a deflection element that deflects the fluorescence in the optical axis direction of the objective 207.

Similarly to the multi-photon excitation laser microscope 200, by using the multi-photon excitation laser microscope 400, the occurrence of vignetting in accordance with the adjustment of the focal position can be suppressed. In addition, since the concave mirror 411 is used instead of the lens 222 and the mirror 223, the number of the optical elements in the focal position adjustment unit may be decreased. Accordingly, a lighter weight and a more compact focal position adjustment unit may be configured, and therefore, by using the focal position adjustment unit, the adjustment of the focal position with a high accuracy may be realized, while sufficiently securing the space at the upper side of the stage 208.

The multi-photon excitation laser microscope 400 may configure the concave mirror 411 as a deformable mirror, which is an optical system in which the focal length is variable. By using the deformable mirror, regardless of the Z position of the objective, the light flux diameter of the fluorescence that is incident to the PMT 211 may be optimized. Further, the multi-photon excitation laser microscope 400 may be multi-channeled with the plurality of PMTs included, as is the multi-photon excitation laser microscope 300 according to embodiment 2. Further, various optical elements may be positioned between the laser light source 201 and the XY scanner 202, and the dichroic mirror 221 may be positioned at an angle other than 45° with respect to the optical axis of the objective 207, in accordance with the feature of the dichroic mirror 221.

Embodiment 4

Figure 6:
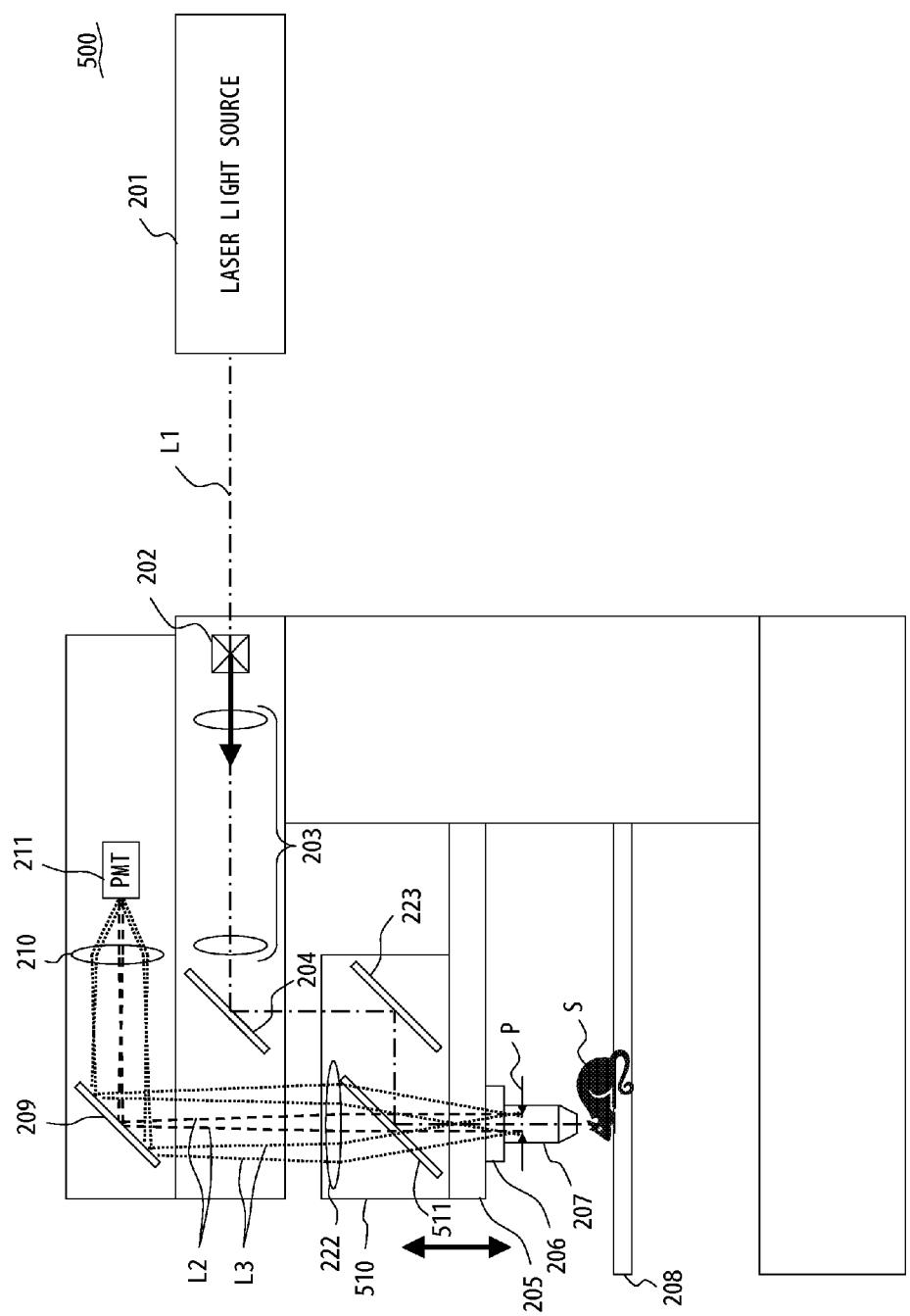
FIG. 6 illustrates a configuration of a multi-photon excitation laser microscope according to embodiment 4 of the present invention.

FIG. 6 illustrates a configuration of a multi-photon excitation laser microscope 500 according to the present embodiment. In FIG. 6, the laser light L1 is indicated by a dotted-dashed line, the on-axis light flux L2 in the fluorescence is indicated by a dashed line, and the off-axis light flux L3 in the fluorescence is indicated by a dotted line.

The multi-photon excitation laser microscope 500 is similar to the multi-photon excitation laser microscope 200 according to embodiment 1 in that it is an upright microscope and observes the sample S positioned on the stage 208 from the upper side, and in that it employs the epi-illumination. The multi-photon excitation laser microscope 500 is different from the multi-photon excitation laser microscope 200 in that it includes an illumination means that includes a laser light source 201 and the like on a reflection optical path of a dichroic mirror 511, which is a wavelength branching element that branches according to wavelength the optical path of the laser light L1 and the optical path of the fluorescence (the on-axis light flux L2, the off-axis light flux L3), and a detection means that includes the PMT 211 and the like on a transmission optical path of the dichroic mirror 511.

In order to realize the above mentioned configuration, the multi-photon excitation laser microscope 500 includes a housing 510 instead of a housing 220. The housing 510 is different from the housing 220 in that the dichroic mirror 511 that makes the laser light L1 reflect and that makes the fluorescence transmit is placed inside of the housing 510 instead of the dichroic mirror 221, and that the lens 222 is positioned on the transmission optical path of the dichroic mirror 511.

Similarly to the multi-photon excitation laser microscope 200, according to the multi-photon excitation laser microscope 500, as the lens 222 converts the fluorescence that has been converted by the objective 207 into a parallel light flux, into a convergent light flux to make the fluorescence be emitted outside of the focal position adjustment unit, the occurrence of vignetting in accordance with the adjustment of the focal position can be suppressed. Further, with the lighter weight and more compact focal position adjustment unit, the adjustment of the focal position with a high accuracy may be realized, while sufficiently securing the space at the upper side of the stage 208.

Further, similarly to the multi-photon excitation laser microscope 200, various modifications may be made to the multi-photon excitation laser microscope 500. In addition, similarly to the multi-photon excitation laser microscope 300 according to embodiment 2, the multi-photon excitation laser microscope 500 may include a plurality of PMTs to be multi-channeled.

Embodiment 5

Figure 7:
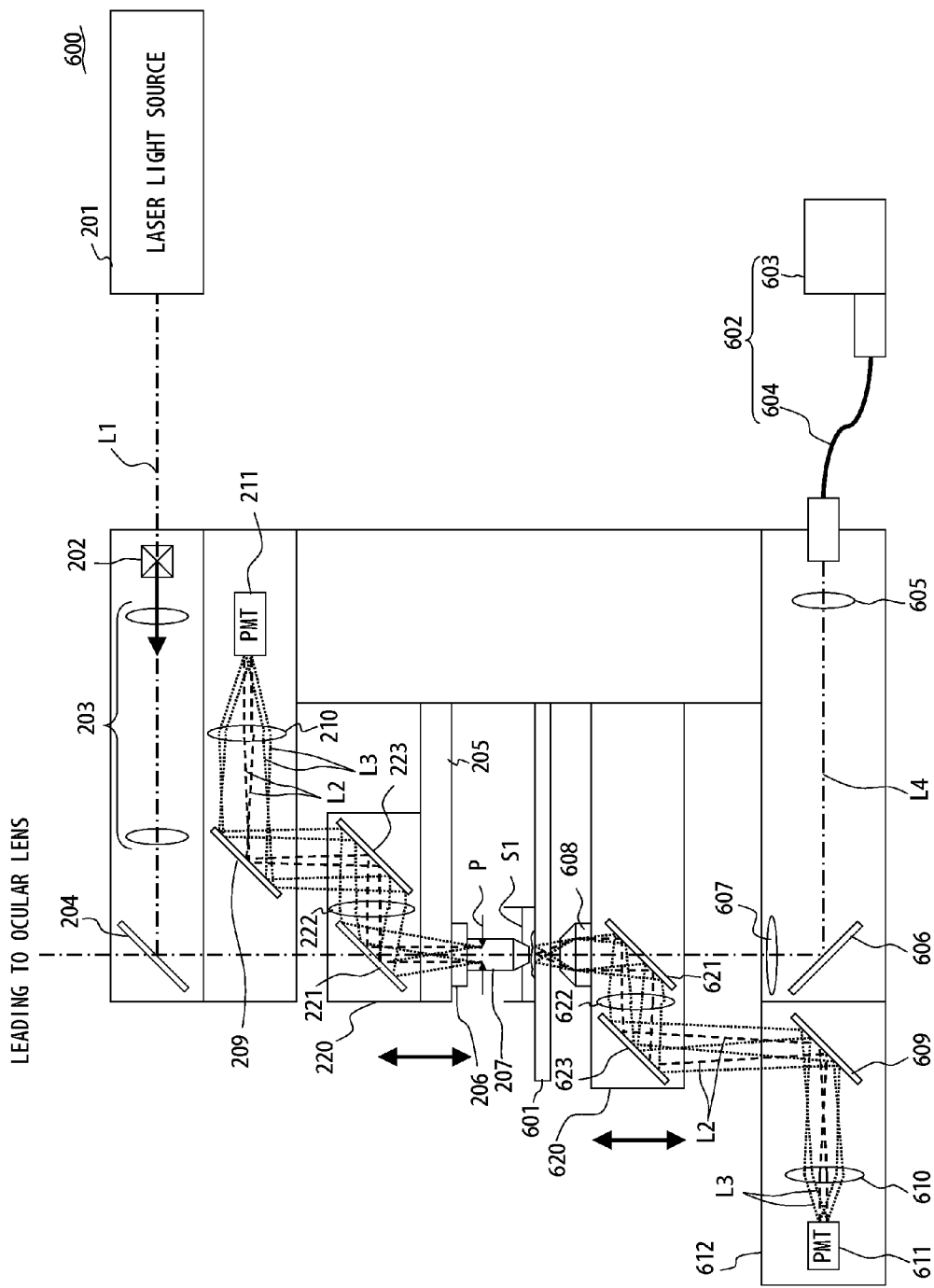
FIG. 7 illustrates a configuration of a multi-photon excitation laser microscope according to embodiment 5 of the present invention.

FIG. 7 illustrates a configuration of a multi-photon excitation laser microscope 600 according to the present embodiment. In FIG. 7, the laser light L1 and the illumination light L4 from an optical fiber light source 602 is indicated by a dotted dashed-line, the on-axis light flux L2 in the fluorescence is indicated by a dashed line, and the off-axis light flux L3 in the fluorescence is indicated by a dotted line.

The multi-photon excitation laser microscope 600 is similar to the multi-photon excitation laser microscope 200 according to embodiment 1 in that it is an upright microscope and observes the sample S positioned on the stage 601 from the upper side. The multi-photon excitation laser microscope 600 is different from the multi-photon excitation laser microscope 200 in that it may perform a transmission illumination from the side of the objective 207 and perform transmission detection at the side of the condenser lens 608. The multi-photon excitation laser microscope 600 is also different from the multi-photon excitation laser microscope 200 in that it may perform a transmission illumination from the side of the condenser lens 608 and perform a bright field observation of the sample S1 by using a not-illustrated ocular lens.

In the multi-photon excitation laser microscope 600, to realize the transmission illumination, a stage 601 that transmits the light is provided instead of the stage 208. On the stage 601, a dish made of a member that transmits the light, such as a glass bottom dish or the like, is positioned, and in the dish, the sample S1 is positioned. Further, at the lower side of the stage 601, the condenser lens 608 is positioned.

The condenser lens 608 is configured such that it moves in the optical axis direction of the condenser lens 608 by using the focal position adjustment unit 620 for adjusting the focal position of the condenser lens 608. The multi-photon excitation laser microscope 600 includes, inside of the focal position adjustment unit 620, a mirror 621 that is positioned attachably and detachably with respect to the optical axis of the condenser lens 608, a lens 622 that has a positive power, and a mirror 623. These components move in the optical axis direction of the condenser lens 608, together with the condenser lens 608. The mirror 621 is positioned on the optical axis of the condenser lens 608 while the transmission illumination is performed with the laser light from the laser light source 201. Further, the mirror 621 is removed from the optical axis of the condenser lens 608 and is positioned outside of the optical path, while the transmission illumination is performed with the illumination light from the later mentioned optical fiber light source 602. In addition, the mirror 204 is also removed from the optical axis of the objective 207 and is positioned outside of the optical path, while the transmission illumination is performed with the illumination light of the optical fiber light source 602.

In order to realize the transmission illumination from the side of the condenser lens 608, the multi-photon excitation laser microscope 600 includes an optical fiber light source 602 that consists of a halogen lamp 603 and an optical fiber 604. An illumination light L4 from the optical fiber light source 602, after collecting the light at a pupil position of the condenser lens 608 through the lens 605, the mirror 606, and the lens 607 that are provided in the microscope body, is incident to the condenser lens 608 and is irradiated to the sample S1 from the lower side. Namely, a Köhler illumination is performed by the illumination light L4 from the optical fiber light source 602.

In the meantime, the light that has been transmitted through the sample S1 by the transmission illumination from the side of the condenser lens 608 is incident to a visual observation optical path through the objective 207 and the dichroic mirror 221 and is incident to the ocular lens through a lens tube for visual observations. With this, the visual observations used for positioning the sample S1 on the stage 601 may become available.

In order to realize the detection by using the transmission illumination from the side of the objective 207, the multi-photon excitation laser microscope 600 includes an external detection unit 612 that is attached to the microscope body. Inside of the external detection unit 612, the external detection unit 612 includes a mirror 609, a lens 610 that has a positive power, and a PMT 611 that is positioned at a pupil-conjugate position of the condenser lens 608. The mirror 609 is attached such that it is positioned on the reflection optical path of the mirror 623. The lens 610 configures a relay optical system that relays the pupil of the condenser lens 608 to the PMT 611, together with the lens 622.

In the fluorescence from the sample S1 to which the laser light L1 from the laser light source 201 has been irradiated, the fluorescence that is taken in by the condenser lens 608 is converted by the condenser lens 608 into the parallel light flux and is incident to the focal position adjustment unit 620. After that, the fluorescence is reflected on the mirror 621 and is converted by the lens 622 into the convergent light flux. Further, the fluorescence is deflected by the mirror 623 in a direction that is parallel to the optical axis of the condenser lens 608, emitted from the focal position adjustment unit 620, and is incident to the external detection unit 612. The fluorescence that is incident to the external detection unit 612 is incident to the PMT 611 through the mirror 609 and the lens 610 and is detected.

As mentioned above, the multi-photon excitation laser microscope 600 includes a focal position adjustment unit that makes the objective 207 move in the optical axis direction and has the focal position adjustment unit 620, which makes the condenser lens 608 move in the optical axis direction. The focal position adjustment unit that makes the objective 207 move in the optical axis direction and that consists of the revolver 206, the revolver arm 205, and the housing 220 is provided on the epi-illumination detection optical path when illuminated with the laser light L1 from the laser light source 201. By contrast, the focal position adjustment unit 620 that makes the condenser lens 608 move in the optical axis direction is provided on the transmission detection optical path when illuminated with the laser light L1 from the laser light source 201.

According to the multi-photon excitation laser microscope 600 that is configured as mentioned above, with each of the focal position adjustment units for the objective 207 and the condenser lens 608, each of the focal positions are adjusted. In particular, when the transmission illumination is performed, adjustments are made such that the focal position of the objective 207 and the focal position of the condenser lens 608 is matched.

Similarly to the multi-photon excitation laser microscope 200, according to the multi-photon excitation laser microscope 600, as the lenses (the lenses 222 and 622) that are positioned in the focal position adjustment unit converge the fluorescence that has been converted by the collecting lenses (the objective 207, the condenser lens 608) into a parallel light flux, into a convergent light flux to be emitted outside of the focal position adjustment unit, the occurrence of vignetting in accordance with the adjustment of the focal position can be suppressed. Further, with the lightweight and compact focal position adjustment unit, the adjustment of the focal position with a high accuracy may be made while securing sufficient space at the upper side of the stage 601. Further, according to the multi-photon excitation laser microscope 600, fluorescence detection of both the epi-illumination and the transmission illumination is available.

Similarly to the multi-photon excitation laser microscope 200, various modifications may be made to the multi-photon excitation laser microscope 600. In addition, similarly to the multi-photon excitation laser microscope 300 according to embodiment 2, the multi-photon excitation laser microscope 600 may include a plurality of PMTs to be multi-channeled. Further, similarly to the multi-photon excitation laser microscope 400 according to embodiment 3, the multi-photon excitation laser microscope 600 may include a concave mirror that serves as a lens with a positive power and as a mirror that is a deflection element, in the focal position adjustment unit. Similarly to the multi-photon excitation laser microscope 500 according to embodiment 4, the multi-photon excitation laser microscope 600 may include a first optical element, which has a positive power, in the focal position adjustment unit and on a transmission optical path of the wavelength branching means and include a detection means on the transmission optical path of the wavelength branching means. The laser light source 201 may be configured as an optical fiber light source. The optical fiber light source is desirable in that it may suppress a transfer of the heat to the microscope body.

Embodiment 6

Figure 8:
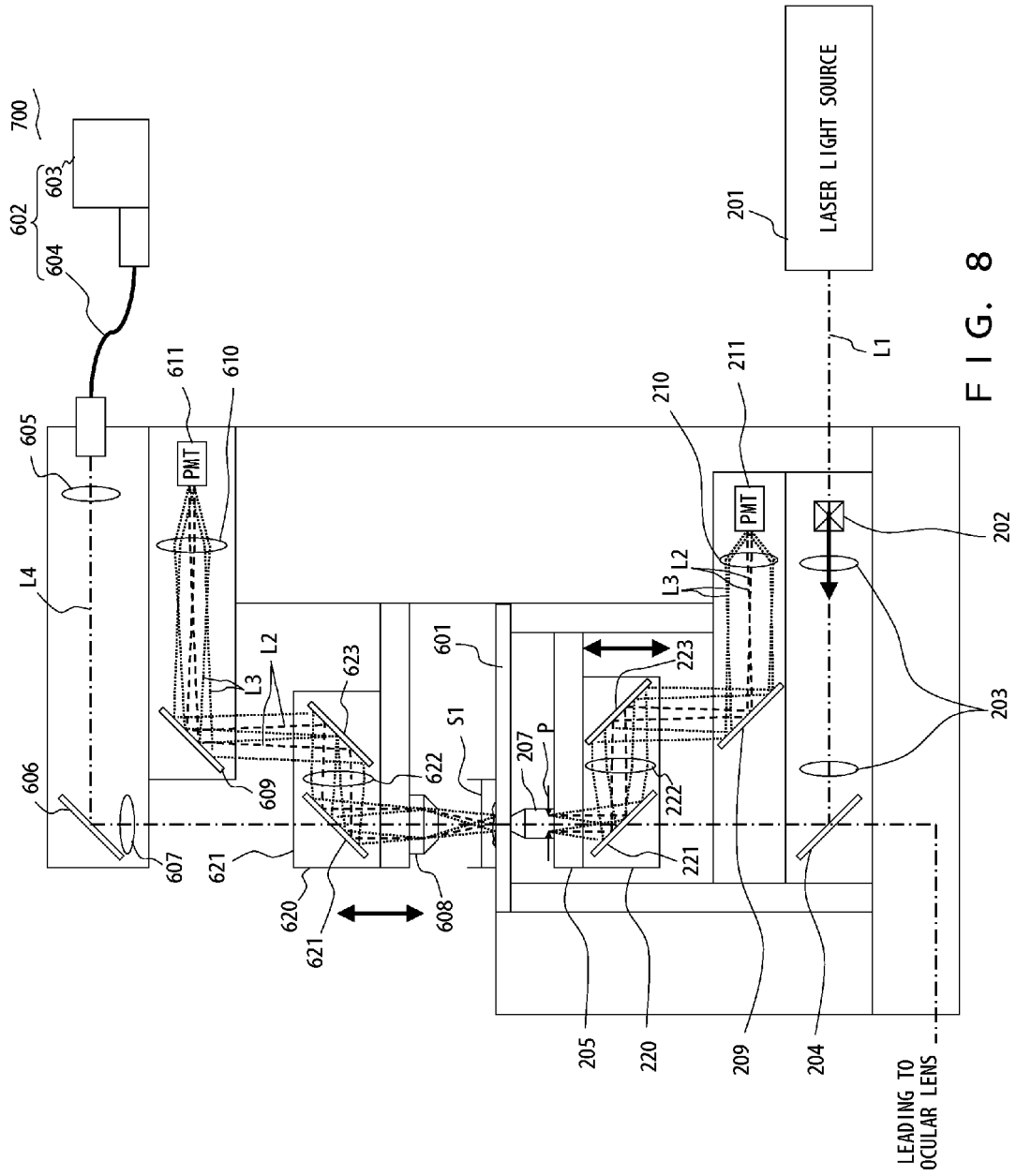
FIG. 8 illustrates a configuration of a multi-photon excitation laser microscope according to embodiment 6 of the present invention.

FIG. 8 illustrates a configuration of a multi-photon excitation laser microscope 700 according to the present embodiment. In FIG. 8, the laser light L1 is indicated by a dotted dashed-line, the on-axis light flux L2 in the fluorescence is indicated by a dashed line, and the off-axis light flux L3 in the fluorescence is indicated by a dotted line.

The multi-photon excitation laser microscope 700 is different from the multi-photon excitation laser microscope 600 according to embodiment 5, in that it is an inverted microscope and observes the sample S positioned on the stage 601 from a lower side. Therefore, in the multi-photon excitation laser microscope 700, the objective 207 that moves in the optical axis direction with the focal position adjustment unit is positioned at the lower side of the stage 601, and the condenser lens 608 that moves in the optical axis direction with the focal position adjustment unit 620 is positioned at the upper side of the stage 601. In other words, in the multi-photon excitation laser microscope 700, the configuration that is at the upper side of the stage 601 in the multi-photon excitation laser microscope 600 is positioned at the lower side of the stage 601, and the configuration that is at the lower side of the stage 601 in the multi-photon excitation laser microscope 600 is positioned at the upper side of the stage 601. Other configurations are similar to those of the multi-photon excitation laser microscope 600 according to embodiment 5.

An effect similar to the multi-photon excitation laser microscope 600 according to embodiment 5 can be obtained by the multi-photon excitation laser microscope 700 as well. Further, similarly to the multi-photon excitation laser microscope 600, various modifications may be made to the multi-photon excitation laser microscope 700 as well.

The embodiments mentioned so far above are specific examples for facilitating understanding of the invention and the invention are not limited to embodiments mentioned above. The scanning microscope described in each of the embodiments may be modified or altered in various ways without departing from the spirit of the present invention that is stipulated by the scope of the claims. For example, although in the above mentioned embodiments, multi-photon excitation laser microscopes are exemplified, the microscopes of the present invention are not limited to multi-photon excitation laser microscopes, and microscopes that are scanning microscopes and that include non-descanned detectors may be used. Further, the focal position adjustment unit is not limited to one that makes the objective move in the optical axis direction and may be make the condenser lens move in the optical axis direction. The focal position adjustment unit may make the collecting lenses (the objective, the condenser lens) that take in the detection light from the sample move in the optical axis direction.

What is claimed is:

1. A multi-photon excitation laser scanning microscope comprising:
a collecting lens configured to take in a detection light from a sample and convert the detection light into a parallel light flux;
a detector positioned at a location that is optically conjugate to a pupil of the collecting lens, the detector being disposed at a body of the microscope;
a relay optical system that relays the pupil of the collecting lens to the detector, the relay optical system including a plurality of optical elements; and
a focal position adjustment unit configured to move in an optical axis direction of the collecting lens together with the collecting lens and some of the plurality of optical elements of the relay optical system, so as to move the collecting lens and said some of the plurality of optical elements of the relay optical system in the optical axis direction,
wherein the detector is disposed at the body of the microscope so as not be movable by the focal position adjustment unit, such that the focal position adjustment unit is configured to move the collecting lens and said some of the plurality of optical elements of the relay optical system in the optical axis direction with respect to the detector,
wherein the relay optical system comprises:
a first optical element having a positive power, the first optical element being positioned in the focal position adjustment unit and configured to convert the detection light that was converted by the collecting lens into the parallel light flux, into a convergent light flux to be emitted outside of the focal position adjustment unit;
a wavelength branching element configured to reflect the detection light and to transmit an illumination light, wherein the wavelength branching element branches, according to wavelength, an optical path of the detection light and an optical path of the illumination light, and wherein the wavelength branching element is positioned in the focal position adjustment unit and between the collecting lens and the first optical element;
a deflection element that deflects the detection light in a direction that is parallel to the optical axis of the collecting lens, the deflection element being positioned in the focal position adjustment unit and between the detector and the wavelength branching element; and
a second optical element having a positive power, the second optical element being positioned outside of the focal position adjustment unit and between the detector and the first optical element,
wherein said some of the plurality of optical elements of the relay optical system which are configured to be moved together with the collecting lens in the optical axis direction by the focal position adjustment unit comprise the first optical element, the wavelength branching element, and the deflection element, and wherein the second optical element, which is positioned outside of the focal position adjustment unit, is configured so as not to be movable by the focal position adjustment unit.

2. The multi-photon excitation laser scanning microscope according to claim 1, wherein the first optical element is an optical system in which a focal length is variable.

3. The multi-photon excitation laser scanning microscope according to claim 1, wherein the focal position adjustment unit is provided in an epi-illumination detection optical path.

4. The multi-photon excitation laser scanning microscope according to claim 1, wherein the focal position adjustment unit is provided in a transmission detection optical path.

5. The multi-photon excitation laser scanning microscope according to claim 1, wherein the focal position adjustment unit further comprises a housing, wherein the first optical element is provided in the housing, and wherein the second optical element is provided outside of the housing.

6. The multi-photon excitation laser scanning microscope according to claim 5, wherein the collecting lens is provided outside of the housing.

7. The multi-photon excitation laser scanning microscope according to claim 6, wherein the focal position adjustment unit further comprises:

a revolver arm on which the housing is provided; and a revolver supported by the revolver arm, and wherein the collecting lens is attached to the revolver.

8. The multi-photon excitation laser scanning microscope according to claim 1, wherein the focal position adjustment unit further comprises a housing, wherein the first optical element and the wavelength branching element are provided in the housing, and wherein the second optical element is provided outside of the housing.

9. The multi-photon excitation laser scanning microscope according to claim 1, wherein the focal position adjustment unit further comprises a housing, wherein the first optical element, the wavelength branching element, and the deflection element are provided in the housing, and wherein the second optical element is provided outside of the housing.

10. The multi-photon excitation laser scanning microscope according to claim 9, further comprising another deflection element which is positioned to receive the detection light deflected by the deflection element and deflect the detection light toward the second optical element, wherein said another deflection element is provided outside of the housing.

11. The multi-photon excitation laser scanning microscope according to claim 1, further comprising another deflection element which is positioned to receive the detection light deflected by the deflection element and deflect the detection light toward the second optical element.

12. A multi-photon excitation laser scanning microscope comprising:

a collecting lens configured to take in a detection light from a sample and convert the detection light into a parallel light flux;

a detector positioned at a location that is optically conjugate to a pupil of the collecting lens, the detector being disposed at a body of the microscope;

a relay optical system that relays the pupil of the collecting lens to the detector, the relay optical system including a plurality of optical elements; and a focal position adjustment unit configured to move in an optical axis direction of the collecting lens together with the collecting lens and some of the plurality of optical elements of the relay optical system, so as to move the collecting lens and said some of the plurality of optical elements of the relay optical system in the optical axis direction, wherein the detector is disposed at the body of the microscope so as not be movable by the focal position adjustment unit, such that the focal position adjustment unit is configured to move the collecting lens and said some of the plurality of optical elements of the relay optical system in the optical axis direction with respect to the detector, wherein the relay optical system comprises:

a first optical element having a positive power, the first optical element being positioned in the focal position adjustment unit, configured to convert the detection light that was converted by the collecting lens into the parallel light flux, into a convergent light flux, and configured to deflect the detection light in a direction that is parallel to the optical axis of the collecting lens to be emitted outside of the focal position adjustment unit;

a wavelength branching element configured to reflect the detection light and to transmit an illumination light, wherein the wavelength branching element branches, according to wavelength, an optical path of the detection light and an optical path of the illumination light, and wherein the wavelength branching element is positioned in the focal position adjustment unit and between the collecting lens and the first optical element; and a second optical element having a positive power, the second optical element being positioned outside of the focal position adjustment unit and between the detector and the first optical element, wherein said some of the plurality of optical elements of the relay optical system which are configured to be moved together with the collecting lens in the optical axis direction by the focal position adjustment unit comprise the first optical element and the wavelength branching element, and wherein the second optical element, which is positioned outside of the focal position adjustment unit, is configured so as not to be movable by the focal position adjustment unit.

13. The multi-photon excitation laser scanning microscope according to claim 12, wherein the first optical element is a concave mirror.

14. The multi-photon excitation laser scanning microscope according to claim 12, wherein the first optical element is a deformable mirror.

15. The multi-photon excitation laser scanning microscope according to claim 12, wherein the first optical element is an optical system in which a focal length is variable.

16. The multi-photon excitation laser scanning microscope according to claim 12, wherein the focal position adjustment unit is provided in an epi-illumination detection optical path.

17. The multi-photon excitation laser scanning microscope according to claim 12, wherein the focal position adjustment unit is provided in a transmission detection optical path.

* * * * *